United States Patent
Li et al.

(10) Patent No.: US 11,145,234 B2
(45) Date of Patent: Oct. 12, 2021

(54) SCREEN PROJECTING METHOD, APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Baoming Li, Beijing (CN); Cheng Liu, Beijing (CN); Xinghui Li, Beijing (CN); Bingyu Yang, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 0 days.

(21) Appl. No.: 17/019,914

(22) Filed: Sep. 14, 2020

(65) Prior Publication Data

US 2021/0193008 A1 Jun. 24, 2021

(30) Foreign Application Priority Data

Jan. 23, 2020 (CN) .......................... 202010076136.6

(51) Int. Cl.
*G09G 3/20* (2006.01)
*G06F 3/14* (2006.01)

(52) U.S. Cl.
CPC ............. *G09G 3/20* (2013.01); *G06F 3/1423* (2013.01); *G09G 2354/00* (2013.01); *G09G 2370/042* (2013.01); *G09G 2370/06* (2013.01)

(58) Field of Classification Search
None
See application file for complete search history.

(56) References Cited

U.S. PATENT DOCUMENTS

| | | | |
|---|---|---|---|
| 2009/0024617 A1* | 1/2009 | Cope | H04N 21/237 |
| 2014/0016161 A1* | 1/2014 | Yamada | H04N 1/00408 |
| | | | 358/1.15 |
| 2015/0097848 A1* | 4/2015 | Maeda | G09G 3/20 |
| | | | 345/531 |
| 2016/0179456 A1* | 6/2016 | Sivavakeesar | G06F 3/165 |
| | | | 715/727 |
| 2016/0364574 A1* | 12/2016 | Plette | G06F 21/6218 |

* cited by examiner

*Primary Examiner* — Duane N Taylor, Jr.
(74) *Attorney, Agent, or Firm* — Harness, Dickey & Pierce, P.L.C.

(57) ABSTRACT

The present application discloses a screen projecting method, an apparatus, a device and a storage medium. A specific implementation is: receiving a request for screen projecting from a terminal device, where the request for screen projecting includes indication information of content to be screen-projected; acquiring the content to be screen-projected according to the request for screen projecting; receiving a first initiating message of at least one screen projecting source from a target projecting device, and determining a target screen projecting source from the at least one screen projecting source; and sending the content to be screen-projected and an identifier of the target screen projecting source to the target projecting device, where the identifier of the target screen projecting source indicates to the target projecting device to display the content to be screen-projected through the target screen projecting source.

20 Claims, 4 Drawing Sheets

The at least one screen projecting source is a plurality of screen projecting sources, the plurality of screen projecting sources include a first type of screen projecting source and a second type of screen projecting source, a confidence score of the first type of screen projecting source are stored in the server, and the server acquires a confidence score of the second type of screen projecting source according to metadata of the second type of screen projecting source ⸺ S501

The server acquires the priority of the at least one screen projecting source according to the confidence score of the first type of screen projecting source and the confidence score of the second type of screen projecting source ⸺ S502

FIG. 5

The server receives second initiating messages from a plurality of projecting devices ⸺ S601

The server determines types of the plurality of projecting devices according to metadata of the plurality of projecting devices ⸺ S602

The server determines the target projecting device from the plurality of projecting device according to the types of the plurality of projecting devices and priorities of the device types ⸺ S603

FIG. 6

SCREEN PROJECTING METHOD, APPARATUS, DEVICE AND STORAGE MEDIUM

CROSS-REFERENCE TO RELATED APPLICATION

This application claims priority to Chinese Patent Application No. 202010076136.6, filed on Jan. 23, 2020, the disclosure of which is hereby incorporated by reference in its entirety.

TECHNICAL FIELD

Embodiments of the present application relate to communication technologies and, in particular, to an internet technology.

BACKGROUND

At present, it is realizable that content that a user wants to watch can be projected onto a terminal, such as a computer, a television, so as to be displayed. For example, a terminal device 1 has a voice receiving function, and receives a request for screen projecting input by a user through voice, where the request for screen projecting includes indication information of content that the user wants to watch; and the terminal device 1 sends the user's request for screen projecting to a server, which retrieves the content and sends the content to a terminal device 2. In addition, the user needs to select a screen projecting source for the terminal device to display the content, and the terminal device 2 displays the content according to the screen projecting source selected by the user.

However, in the above method, the server needs to search for available screen projecting sources and send them to a projecting device for the user to select a screen projecting source, leading to a low efficiency of screen projection.

SUMMARY

Embodiments of the present application provide a screen projecting method, an apparatus, a device and a storage medium, which improves the screen projecting efficiency.

In a first aspect, an embodiment of the present application provides a screen projecting method, applied to a server, including: receiving a request for screen projecting from a terminal device, where the request for screen projecting includes indication information of content to be screen-projected; acquiring the content to be screen-projected according to the request for screen projecting; receiving a first initiating message of at least one screen projecting source from a target projecting device, and determining a target screen projecting source from the at least one screen projecting source; and sending the content to be screen-projected and an identifier of the target screen projecting source to the target projecting device, where the identifier of the target screen projecting source indicates to the target projecting device to display the content to be screen-projected through the target screen projecting source.

In this solution, the server can automatically determine the target screen projecting source from the screen projecting sources initiated by the projecting device, without searching for available screen projecting sources, and send the available screen projecting sources to the projecting device for a user to select, thus improving the projection efficiency.

In a possible implementation, the first initiating message includes metadata of the at least one screen projecting source; the determining the target screen projecting source from the at least one screen projecting source includes: determining a priority of the at least one screen projecting source according to the metadata of the at least one screen projecting source; and determining a screen projecting source with the highest priority among the at least one screen projecting source as the target screen projecting source.

In this solution, the priority of the at least one screen projecting source is determined through the metadata of the at least one screen projecting source, which is simple and accurate.

In a possible implementation, the determining the priority of the at least one screen projecting source according to the metadata of the at least one screen projecting source includes: for each screen projecting source of the at least one screen projecting source: acquiring a confidence score of the each screen projecting source according to metadata of the each screen projecting source; and determining the priority of the at least one screen projecting source according to the respective confidence score of the at least one screen projecting source.

This solution provides a specific implementation of determining the priority of the each screen projecting source through the metadata of the screen projecting source.

In a possible implementation, the acquiring the confidence score of the each screen projecting source according to metadata of the each screen projecting source includes: acquiring the confidence score of the each screen projecting source according to items of information and corresponding relationships included in the metadata of the each screen projecting source; where the corresponding relationship includes a plurality of preset information groups and scores corresponding to preset information.

This solution provides a specific implementation of acquiring the confidence score of the each screen projecting source according to the metadata of the each screen projecting source.

In a possible implementation, the confidence score of the at least one screen projecting source is stored in the server, and the confidence score of the at least one screen projecting source is used to determine a priority of the at least one screen projecting source; the determining the priority of the at least one screen projecting source according to metadata of the at least one screen projecting source includes: judging whether there is a first screen projecting source whose metadata is changed in the at least one screen projecting source; if yes, reacquiring a confidence score of the first screen projecting source; and determining the priority of the at least one screen projecting source according to the reacquired confidence score of the first screen projecting source and confidence scores of other screen projecting sources of the at least one screen projecting source stored in the server.

This solution provides yet another specific implementation of determining the priority of the screen projecting source through the metadata of the screen projecting source. In this solution, the confidence score of the screen projecting source whose metadata is changed is recalculated, which can guarantee the correct priority of the screen projecting source.

In a possible implementation, the at least one screen projecting source is a plurality of screen projecting sources, and the plurality of screen projecting sources include a first type of screen projecting source and a second type of screen projecting source; a confidence score of the first type of screen projecting source is stored in the server, and the confidence score of the first type of screen projecting source is used to determine a priority of the first type of screen projecting source; the determining the priority of the at least one screen projecting source according to metadata of the at least one screen projecting source includes: acquiring a confidence score of the second type of screen projecting source according to metadata of the second type of screen projecting source; and acquiring the priority of the at least one screen projecting source according to the confidence score of the first type of screen projecting source and the confidence score of the second type of screen projecting source.

This solution provides yet another specific implementation of determining the priority of the screen projecting source through the metadata of the screen projecting source.

In a possible implementation, before determining the target screen projecting source from the at least one screen projecting source, further including: receiving second initiating messages from a plurality of projecting devices, where the second initiating messages include metadata of the plurality of projecting devices, and a network where the plurality of projecting devices are located is the same as a network where the terminal device is located; determining types of the plurality of projecting devices according to the metadata of the plurality of projecting devices; and determining the target projecting device from the plurality of projecting devices according to the types of the plurality of projecting devices and priorities of the device types.

This solution provides a specific implementation of determining the target projecting device.

In a possible implementation, the determining the target projecting device from the plurality of projecting devices according to the types of the plurality of projecting devices and the priorities of the device types includes: determining that a priority of a device type of a plurality of first projecting devices among the plurality of projecting devices is the highest according to the priorities of the device types; sending a first projecting device list to each of the first projecting devices, where the first projecting device list is used for a user to input a selection instruction of the target projecting device to at least one of the first projecting devices; receiving indication information of the target projecting device from the first projecting devices; and determining the target projecting device according to the indication information of the target projecting device.

This solution provides a specific implementation of determining the target projecting device under the condition that there are a plurality of projecting devices with the highest priority.

In a second aspect, an embodiment of the present application provides an screen projecting apparatus, includes: a transceiving module, configured to receive a request for screen projecting from a terminal device, where the request for screen projecting includes indication information of content to be screen-projected; a processing module, configured to acquire the content to be screen-projected according to the request for screen projecting; the transceiving module, is further configured to receive a first initiating message of at least one screen projecting source from a target projecting device; the processing module, is further configured to determine a target screen projecting source from the at least one screen projecting source; and the transceiving module, is further configured to send the content to be screen-projected and an identifier of the target screen projecting source to the target projecting device, where the identifier of the target screen projecting source indicates to the target projecting device to display the content to be screen-projected through the target screen projecting source.

In a possible implementation, the first initiating message includes metadata of the at least one screen projecting source; the processing module, is specifically configured to: determine a priority of the at least one screen projecting source according to the metadata of the at least one screen projecting source; and determine a screen projecting source with the highest priority among the at least one screen projecting source as the target screen projecting source.

In a possible implementation, the processing module is specifically configured to: for each screen projecting source of the at least one screen projecting source: acquire a confidence score of the each screen projecting source according to metadata of the each screen projecting source; and determine the priority of the at least one screen projecting source according to the respective confidence score of the at least one screen projecting source.

In a possible implementation, the processing module is specifically configured to: acquire the confidence score of the each screen projecting source according to items of information and corresponding relationships included in the metadata of the each screen projecting source; where the corresponding relationship includes a plurality of preset information groups and scores corresponding to preset information.

In a possible implementation, the confidence score of the at least one screen projecting source is stored in the server, the confidence score of the at least one screen projecting source is used to determine a priority of the at least one screen projecting source, and the processing module is specifically configured to: judge whether there is a first screen projecting source whose metadata is changed in the at least one screen projecting source; if yes, reacquire a confidence score of the first screen projecting source; and determine the priority of the at least one screen projecting source according to the reacquired confidence score of the first screen projecting source and confidence scores of other screen projecting sources of the at least one screen projecting source stored in the server.

In a possible implementation, the at least one screen projecting source is a plurality of screen projecting sources, and the plurality of screen projecting sources include a first type of screen projecting source and a second type of screen projecting source; a confidence score of the first type of screen projecting source is stored in the server, and the confidence score of the first type of screen projecting source is used to determine a priority of the first type of screen projecting source; the processing module is specifically configured to: acquire a confidence score of the second type of screen projecting source according to metadata of the second type of screen projecting source; and acquire the priority of the at least one screen projecting source according to the confidence score of the first type of screen projecting source and the confidence score of the second type of screen projecting source.

In a possible implementation, before the processing module determines the target screen projecting source from the at least one screen projecting source: the transceiving module is configured to receive second initiating messages from a plurality of projecting devices, where the second initiating messages include metadata of the plurality of projecting devices, and a network where the plurality of projecting devices are located is the same as a network where the terminal device is located; the processing module is configured to determine types of the plurality of projecting devices according to the metadata of the plurality of projecting devices; and determine the target projecting device from the plurality of projecting devices according to the types of the plurality of projecting devices and priorities of the device types.

In a possible implementation, the processing module is specifically configured to: determine that a priority of a device type of a plurality of first projecting devices among the plurality of projecting devices is the highest according to the priorities of the device types; the transceiving module is further configured to send a first projecting device list to each of the first projecting devices, where the first projecting device list is used for a user to input a selection instruction of the target projecting device to at least one of the first projecting devices and receive indication information of the target projecting device from the first projecting devices; and the processing module is further specifically configured to: determine the target projecting device according to the indication information of the target projecting device.

In a third aspect, an embodiment of the present application provides an electronic device, includes: at least one processor; and a memory communicatively connected to the at least one processor; where the memory stores instructions executable by the at least one processor, the instructions being executed by the at least one processor to enable the at least one processor to execute the method described in the first aspect and any possible design of the first aspect.

In a fourth aspect, the present application provides a non-transitory computer-readable storage medium storing computer instructions, the computer instructions being used to execute the method described in the first aspect and any possible design of the first aspect.

An embodiment of the application has the following advantages or beneficial effects: the screen projection efficiency can be improved. Because the server determines the used target screen projecting source according to the metadata of the initiated screen projecting source, the problem in the prior art that the available screen projecting source needs to be searched and sent to the projecting device for the user to select, which leads to low screen projection efficiency, is overcome, and the technical effect of a relatively high efficiency of screen projection is guaranteed.

Other effects of the above-mentioned ways will be illustrated below in conjunction with specific embodiments.

BRIEF DESCRIPTION OF DRAWINGS

The attached drawings are used for a better understanding of the solutions and do not constitute a limitation of the present application. Among them:

FIG. 5 is a flowchart of a method for determining a priority of at least one screen projecting source provided by yet another embodiment of the present application;

FIG. 6 is a flowchart of a screen projecting method provided by another embodiment of the present application;

DESCRIPTION OF EMBODIMENTS

Exemplary embodiments of the present application will be illustrated in combination with the accompanying drawings in the following, which include various details of the embodiments of the present application to facilitate understanding, and they should be considered as merely exemplary. Therefore, those of ordinary skill in the art should recognize that various changes and modifications can be made to the embodiments described herein without departing from the scope and spirit of the present application. Also, for clarity and conciseness, description of well-known functions and structures are omitted in the following description.

In the present application, "at least one" means one or more, and "a plurality of" means two or more than two. "and/or", which describes an associated relationship of associated objects, denotes that there may be three kinds of relationships. For example, A and/or B, which may denote situations that: A exists alone, A and B exist simultaneously, and B exists alone, where A and B may be singular or plural. The character "/" generally denotes that the objects associated before and after have an "or" relationship. "At least one item (one) of the following" or similar expression thereof refers to any combination of these items, including any combination of single item (one) or plural items (plural). For example, at least one item (one) of a, b or c can represent: a, b, c, a-b, a-c, b-c, or a-b-c, where a, b, and c may be single, and may also be multiple. In the present application, the terms "first", "second", and the like are used to distinguish similar objects, and are not necessarily used to describe a specific order or sequence.

As described above, in the prior art, the server is required to search for available screen projecting sources and send them to the projecting device for the user to select a screen projecting source, thus the screen projecting efficiency is not high. To solve this technical problem, the present application provides a screen projecting method, an apparatus, a device and a storage medium.

The main idea of the present application is that the server can automatically select a target screen projecting source in at least one screen projecting source, and send an identifier of the target screen projecting source and content to be screen-projected to a target projecting device, so that the target projecting device displays the content to be screen-projected through the target screen projecting source.

Figure 1:
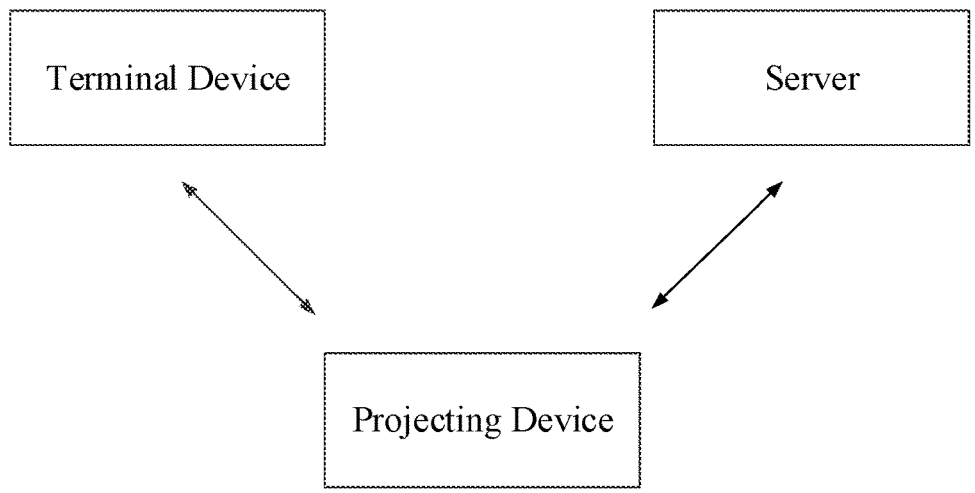
FIG. 1 is an application scenario diagram provided by the present application.

Exemplary, FIG. 1 is an application scenario diagram provided by the present application. As shown in FIG. 1, network elements involved in the present application include a terminal device, a server and a projecting device, and among the three devices, data transmission can be implemented under a communication network, which may be a mobile communication network or a wireless fidelity (WiFi) network, or the like. It should be noted that, FIG. 1 only shows one projecting device, but actually, there may be a plurality of projecting devices, and the present application does not limit the number of the projecting device.

In an embodiment, the above-mentioned terminal device is an intelligent terminal which can acquire voice data, such as a mobile phone, an intelligent speaker. The above-mentioned projecting device is a device having a display function such as a television, a projector.

The technical solutions of the present application are illustrated in detail below.

Figure 2:
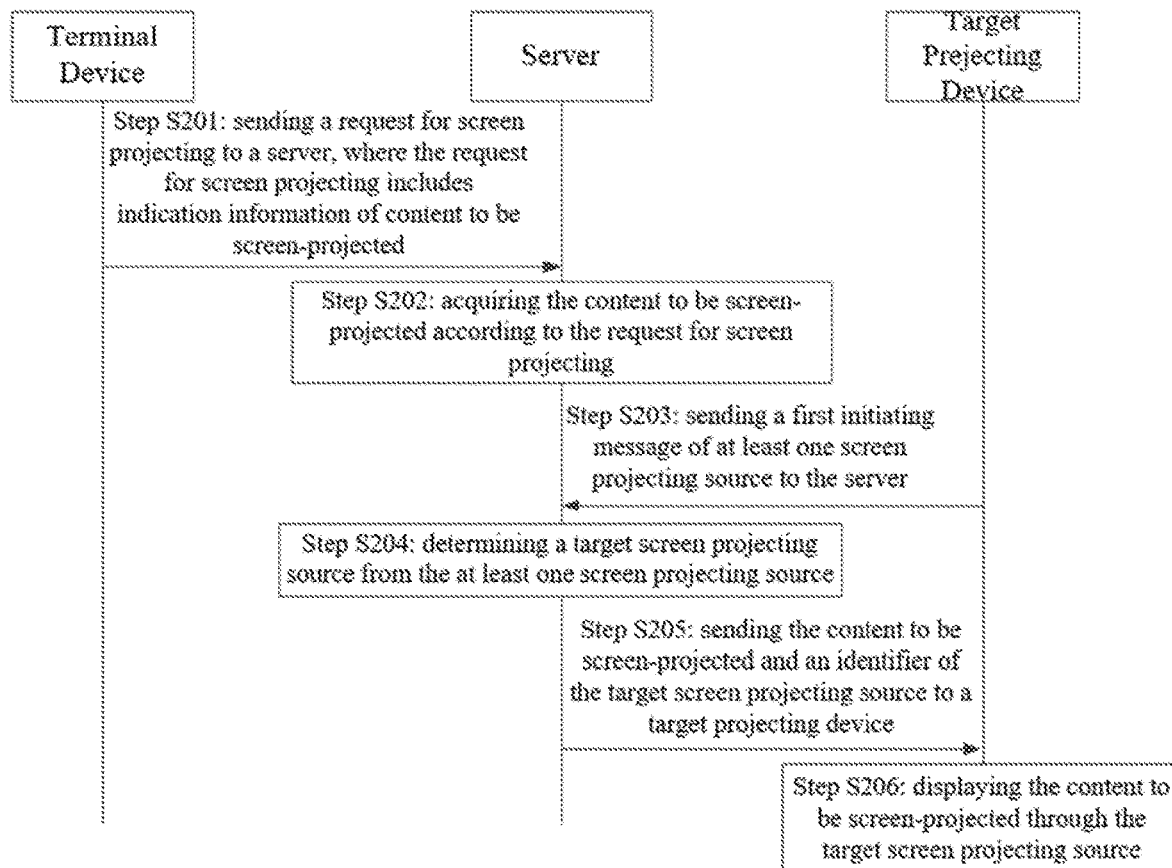
FIG. 2 is a flowchart of a screen projecting method provided by an embodiment of the present application.

FIG. 2 is a flowchart of a screen projecting method provided by an embodiment of the present application. The executive entities involved in the method include a terminal device, a server and a target projecting device. As shown in FIG. 2, the method includes the following steps.

Step S201: the terminal device sends a request for screen projecting to the server, where the request for screen projecting includes indication information of content to be screen-projected.

The request for screen projecting is used to request for displaying the content to be screen-projected. The indication information of the content to be screen-projected may be an identifier or a storage address of the content to be screen-projected, or the like. The identifier of the content to be screen-projected is used to uniquely identify the content to be screen-projected, for example, an identifier of a video is 001. The storage address of the content to be screen-projected refers to a storage address of the content to be screen-projected in the above-mentioned server or a cloud server, or the like.

The above-mentioned content to be screen-projected may be text, video, image, and the like, which is not limited by the present application.

Step S202: the server acquires the content to be screen-projected according to the request for screen projecting.

As described above, the indication information of the content to be screen-projected may be the identifier or the storage address of the content to be screen-projected, or the like. When the indication information of the content to be screen-projected is the identifier of the content to be screen-projected, the server may search for the content to be screen-projected in a local or cloud server according to the identifier, to acquire the content to be screen-projected. When the indication information of the content to be screen-projected is the storage address, the server may acquire the content to be screen-projected from the local or cloud server through the storage address.

Step S203: the target projecting device sends a first initiating message of at least one screen projecting source to the server.

In one way, after the user turns on the target projecting device, a part or all of screen projecting sources on the target projecting device will be automatically initiated (a built-in screen projecting source of the target projecting device will be automatically initiated after the target projecting device is turned on, and whether other screen projecting sources on the target projecting device will be automatically initiated after the user turns on the target projecting device needs to be determined according to whether the user sets the screen projecting sources as starting up items in starting up setting information).

In another way, the target projecting device receives an initiating instruction of screen projecting source input by the user, and initiates a corresponding screen projecting source according to the initiating instruction of screen projecting source.

After the at least one screen projecting source on the target projecting device is initiated, the target projecting device sends the first initiating message of the at least one screen projecting source to the server, to indicate that the at least one screen projecting source has been initiated.

The above-mentioned screen projecting source may also be referred to as a player in the target projecting device. The player may be a built-in player of system or a player downloaded by the user according to requirements, which is not limited by the present application. At least one screen projecting source can be installed on one projecting device.

Step S204: the server determines a target screen projecting source from the at least one screen projecting source.

The determining of the target screen projecting source from the at least one screen projecting source by the server includes that: the server acquires a priority of each screen projecting source of the at least one screen projecting source; and determines a screen projecting source with the highest priority among the at least one screen projecting source as the target screen projecting source.

The acquiring of the priority of each screen projecting source of the at least one screen projecting source by the server can be implemented by the following but not limited to the following two ways:

One way: the at least one screen projecting source is preconfigured with a corresponding priority. For example, Table 1 exemplarily shows priorities of the plurality of screen projecting sources, specifically as follows:

TABLE 1

| Screen projecting source | Priority |
| --- | --- |
| Screen projecting source A | 1 |
| Screen projecting source B | 2 |
| Screen projecting source C | 3 |

Among them, the greater the number of the priority is, the higher the priority is. Based on this, when the above-mentioned at least one screen projecting source includes: a screen projecting source A, a screen projecting source B and a screen projecting source C, the server determines the screen projecting source C with the highest priority as the target screen projecting source.

Another way: determining the priority of the at least one screen projecting source according to metadata of the at least one screen projecting source.

The metadata of any screen projecting source includes at least one item of the following: friendly name, manufacturer and model of the screen projecting source.

The metadata of the screen projecting source may be carried in the initiating message of the screen projecting source sent to the server when the screen projecting source is initiated. It can be understood that, each time the screen projecting source is initiated, the initiating message of the screen projecting source sent to the server may carry the metadata of the screen projecting source. That is to say, when the server acquires the priority of the screen projecting source, the priority may be acquired previously according to the metadata of the screen projecting source, or may be acquired by the server according to the metadata carried in the currently received first initiating message.

Step S205: the server sends the content to be screen-projected and an identifier of the target screen projecting source to the target projecting device.

The identifier of the target screen projecting source is used to uniquely identify the target screen projecting source, and it may be a name or other identifiers of the target screen projecting source, or the like, which is not limited by the present application. For example, the name of the target screen projecting source is the screen projecting source C.

The server can send the content to be screen-projected together with the identifier of the target screen projecting source to the target projecting device, or separately send the content to be screen-projected and the identifier of the target screen projecting source to the target projecting device.

Step S206: the target projecting device displays the content to be screen-projected through the target screen projecting source.

To sum up, the present application provides a screen projecting method, including: receiving, by the server, the request for screen projecting from the terminal device, where the request for screen projecting includes indication information of the content to be screen-projected; acquiring the content to be screen-projected according to the request for screen projecting; receiving the first initiating message of the at least one screen projecting source from the target projecting device, and determining the target screen projecting source from the at least one screen projecting source; sending the content to be screen-projected and the identifier of the target screen projecting source to the target projecting device, so that the target projecting device displays the content to be screen-projected through the target screen projecting source. That is, in the present application, the server can automatically determine the target screen projecting source, without searching for available screen projecting sources and sending them to the projecting device for the user to select the screen projecting source, thus improving the screen projection efficiency.

Figure 3:
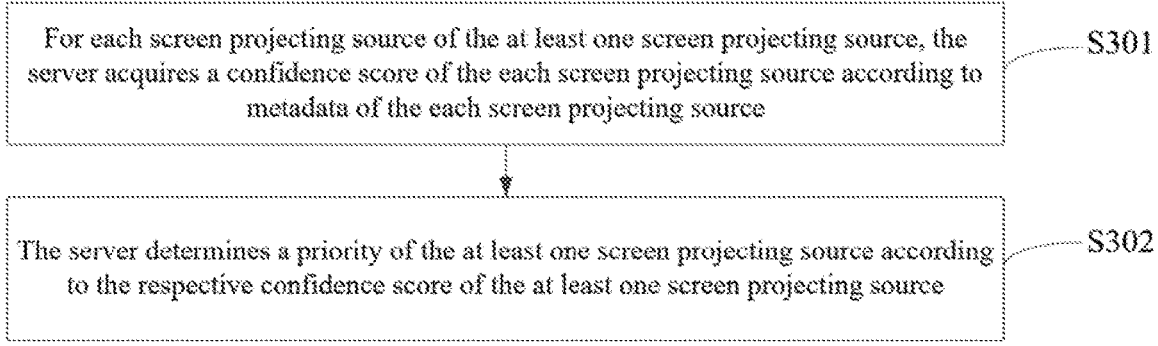
FIG. 3 is a flowchart of a method for determining a priority of at least one screen projecting source provided by an embodiment of the present application.
Figure 4:
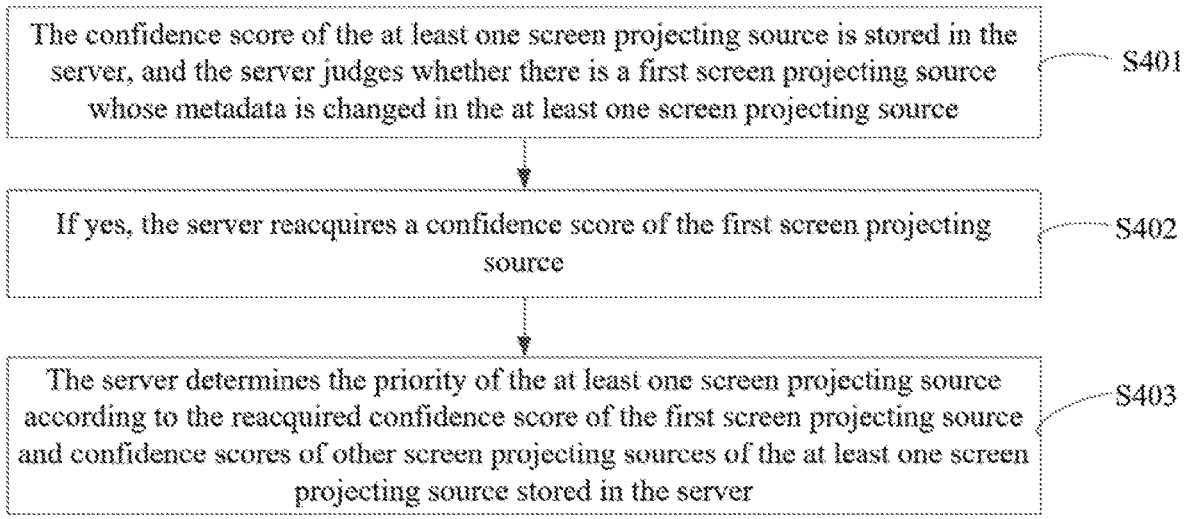
FIG. 4 is a flowchart of a method for determining a priority of at least one screen projecting source provided by another embodiment of the present application.

In the following, embodiments shown in FIG. 3 to FIG. 5 are used to illustrate several implementations, in which the server determines the priority of the at least one screen projecting source according to the metadata of the at least one screen projecting source in the above second way of the step S204.

FIG. 3 is a flowchart of a method for determining a priority of at least one screen projecting source provided by an embodiment of the present application. As shown in FIG. 3, the method includes the following steps.

Step S301: for each screen projecting source of the at least one screen projecting source, the server acquires a confidence score of the each screen projecting source according to metadata of the each screen projecting source.

The confidence score may be a specific value.

In one way, the acquiring of the confidence score of the each screen projecting source according to the metadata of the each screen projecting source includes: acquiring the confidence score of the each screen projecting source according to items of information and corresponding relationships included in the metadata of the each screen projecting source; the corresponding relationship includes a plurality of preset information groups and scores corresponding to preset information.

In a specific implementation, the acquiring of the confidence score of the each screen projecting source according to items of information and corresponding relationships included in the metadata of the each screen projecting source includes: for each item of information included in the metadata of the screen projecting source, determining, according to a corresponding relationship, a target preset information group where this item of information is located, and determining a score corresponding to the target preset information group as a score of this item of information; and acquiring a sum of scores of the various items of information included in the metadata of the screen projecting source, to obtain the confidence score of the screen projecting source.

Each corresponding item in the metadata of the screen projecting source has a plurality of preset information groups. For example: for the item of friendly name, there are a plurality of preset information groups, each preset information group includes one or more friendly names, and each preset information group corresponds to different scores. For another example, for the item of the manufacturer, there are a plurality of preset information groups, each preset information group includes one or more manufacturers, and each preset information group corresponds to different scores. For yet another example, for the item of the model, there are a plurality of preset information groups, each preset information group includes one or more kinds of models, and each preset information group corresponds to different scores.

Exemplarily, the plurality of preset information groups corresponding to the manufacturer are shown in Table 2, the plurality of preset information groups corresponding to the friendly name are shown in Table 3, and the plurality of preset information groups corresponding to the model are shown in Table 4.

TABLE 2

| Preset information group corresponding to the manufacturer | Score |
|---|---|
| (Manufacturer 0001, Manufacturer 0002, Manufacturer 0003) | 9 |
| (Manufacturer 0004, Manufacturer 0005, Manufacturer 0006) | 7 |
| (Manufacturer 0007, Manufacturer 0008) | 5 |

TABLE 3

| Preset information group corresponding to the friendly name | Score |
|---|---|
| (Friendly name a, Friendly name b, Friendly name c) | 8 |
| (Friendly name d, Friendly name e) | 6 |
| (Friendly name f, Friendly name g) | 4 |

TABLE 4

| Preset information group corresponding to the model | Score |
|---|---|
| (Model 01, Model 02, Model 03) | 5 |
| (Model 04, Model 05) | 3 |
| (Model 06, Model 07) | 1 |

Exemplarily, if the manufacturer in the metadata of screen projecting source 1 is 0003, the friendly name is d, and the model is 01, then the target preset information group of the manufacturer 0003 is (manufacturer 0001, manufacturer 0002, and manufacturer 0003), and the corresponding score of (manufacturer 0001, manufacturer 0002, and manufacturer 0003) is 9, that is, the manufacturer 0003 in the metadata of the screen projecting source 1 is 9. Similarly, it can be obtained that the score of the friendly name d in the metadata of the screen projecting source 1 is 6, the score of the model 01 in the metadata of the screen projecting source 1 is 5, then the confidence score of the screen projecting source 1 is 6+9+5=20.

Step S302: the server determines the priority of the at least one screen projecting source according to the respective confidence score of the at least one screen projecting source.

The higher the confidence score is, the higher the priority of the screen projecting source is. For example, the target projecting device initiates three screen projecting sources as follow: a screen projecting source 1, a screen projecting source 2 and a screen projecting source 3. The confidence score of the screen projecting source 1 is 20, the confidence score of the screen projecting source 2 is 15 and the confidence score of the screen projecting source 3 is 22, so the priorities of the screen projecting source 1, the screen projecting source 2 and the screen projecting source 3 are that the priority of the screen projecting source 3 is higher than that of the screen projecting source 1 and the priority of the screen projecting source 1 is higher than that of the screen projecting source 2.

This embodiment provides a way to acquire the priority of the screen projecting source. Based on this, the server can determine the target screen projecting source according to the priority of each screen projecting source, that is, the purpose of automatically selecting the target screen projecting source by the server is achieved.

FIG. 4 is a flowchart of a method for determining a priority of at least one screen projecting source provided by another embodiment of the present application. The applicable scenario in this embodiment is that the server stores a priority and a confidence score of the at least one screen projecting source initiated by the target projecting device, and the confidence score of the screen projecting source is used to acquire the priority of the screen projecting source. As shown in FIG. 4, the method includes the following steps.

Step S401: the server judges whether there is a first screen projecting source whose metadata is changed in the at least one screen projecting source.

Step S402: if yes, the server reacquires the confidence score of the first screen projecting source.

For the method for reacquiring, by the server, the confidence score of the first screen projecting source, the method for acquiring the confidence score of the screen projecting source described in the embodiment shown in FIG. 3 is referred to, which is not repeated here.

Step S403: the server determines the priority of the at least one screen projecting source according to the reacquired confidence score of the first screen projecting source and confidence scores of other screen projecting sources of the at least one screen projecting source stored in the server.

Specifically, since the confidence score of the screen projecting source is determined according to the metadata of the screen projecting source, and the priority of the screen projecting source is determined according to the confidence score of the screen projecting source, when the metadata of the screen projecting source is changed, the confidence score of the screen projecting source will be affected, which then affects the priority of the screen projecting source. Therefore, when there is a first screen projecting source whose metadata is changed, the server needs to reacquire the confidence score of the first screen projecting source. For the screen projecting sources whose metadata is not changed, since the serve has stored the confidence scores of such kind of screen projecting sources, the server can directly acquire the confidence scores of such kind of screen projecting sources. Then, the server determines the priority of the at least one screen projecting source according to the reacquired confidence score of the first screen projecting source and the confidence scores of other screen projecting sources of the at least one screen projecting source stored in the server.

Exemplary, it is assumed that the at least one screen projecting source includes: a screen projecting source A, a screen projecting source B and a screen projecting source C, and their respective confidence scores are determined according to the metadata. The server currently stores the confidence scores of the screen projecting source A, the screen projecting source B and the screen projecting source C, and after receiving initiating message of the screen projecting source A, the screen projecting source B and the screen projecting source C, the server detects whether the metadata of the screen projecting source A, the screen projecting source B and the screen projecting source C is changed. When the server determines that the metadata of the screen projecting source A has been changed, while the metadata of the screen projecting source B and the screen projecting source C has not been changed, the server re-determines the confidence score of the screen projecting source A according to the changed metadata, and reacquires the priorities of the screen projecting source A, the screen projecting source B and the screen projecting source C according to the confidence score of the screen projecting source A that is reacquired as well as the confidence score of the screen projecting source B and the confidence score of the screen projecting source C that are stored in the server.

In the present application, the server stores the confidence score of the at least one screen projecting source, and judges whether there is a first screen projecting source whose metadata is changed in the at least one screen projecting source; if yes, reacquires the confidence score of the first screen projecting source and determines the priority of the at least one screen projecting source according to the reacquired confidence score of the first screen projecting source and the confidence scores of other screen projecting sources of the at least one screen projecting source stored in the server. If there is no first screen projecting source whose metadata is changed in the at least one screen projecting source, then the server adopts the priority of the at least one screen projecting source stored previously. Based on this, the server can determine the target screen projecting source according to the priority of each screen projecting source, that is, the purpose of automatically selecting the target screen projecting source by the server is achieved.

FIG. 5 is a flowchart of a method for determining a priority of at least one screen projecting source provided by yet another embodiment of the present application. The applicable scenario of this embodiment is that: the at least one screen projecting source is a plurality of screen projecting sources, the plurality of screen projecting sources include a first type of screen projecting source and a second type of screen projecting source, a priority and a confidence score of the first type of screen projecting source are stored in the server, and the confidence score of the screen projecting source is used to acquire the priority of the screen projecting source. As shown in FIG. 5, the method includes the following steps.

Step S501: the server acquires a confidence score of the second type of screen projecting source according to metadata of the second type of screen projecting source.

Since the confidence score of the second type of screen projecting source is not stored in the server, the server acquires the confidence score of the second type of screen projecting source according to the metadata of the second type of screen projecting source. For how the server acquires the confidence score of the second type of screen projecting source, the above method embodiments can be referred to, which is not repeated here.

Step S502: the server acquires the priority of the at least one screen projecting source according to the confidence score of the first type of screen projecting source and the confidence score of the second type of screen projecting source.

Specifically, since the confidence score of the first type of screen projecting source is stored in the server, the server can directly use the confidence score of the first type of screen projecting source. The server acquires the priority of the at least one screen projecting source according to the confidence score of the first type of screen projecting source and the confidence score of the second type of screen projecting source.

In other implementations, if there is a first target screen projecting source whose metadata has been changed in the first type of screen projecting source, then the server can reacquire the confidence score of the first target screen projecting source according to the changed metadata of the first target screen projecting source, and acquire the priority of the at least one screen projecting source according to the reacquired confidence score of the first target screen projecting source, the confidence scores of other screen projecting sources of the first type and the confidence score of the second type of screen projecting source.

In the present application, the server stores the confidence score of the first type of screen projecting source, and does not store the confidence score of the second type of screen projecting source, thus, the server acquires the confidence score of the second type of screen projecting source according to the metadata of the second type of screen projecting source. The server acquires the priority of the at least one screen projecting source according to the confidence score of the first type of screen projecting source and the confidence score of the second type of screen projecting source. Based on this, the server can determine the target screen projecting source according to the priority of each screen projecting source, that is, the purpose of automatically selecting the target screen projecting source by the server is achieved.

FIG. 6 is a flowchart of a screen projecting method provided by another embodiment of the present application. As shown in FIG. 6, on the basis of the embodiment corresponding to FIG. 2, further, before the step S203, the screen projecting method may also include the following steps.

Step S601: the server receives second initiating messages from a plurality of projecting devices.

Before the step S601, it is further included that: the server determines the plurality of projecting devices. It can be understood that the projecting devices all send an initiating message (i.e., the second initiating message in this embodiment) to the server after each initiating, thus the server will receive the second initiating messages of the plurality of projecting devices at the same time, and the plurality of projecting devices in this embodiment are those in the same network as the terminal device among the N projecting devices. N is a positive integer, in this embodiment, N is an integer greater than 1.

That is to say, the above-mentioned plurality of projecting devices include: the target projecting device and at least one other projecting device, and the information of the network where the plurality of projecting devices are located is the same as the network where the terminal device is located.

The second initiating message sent by any projecting device is used to indicate that the projecting device has been initiated, and the server can perform content displaying through the projecting device. The second initiating message includes the metadata of the projecting device. The metadata of the projecting device includes at least one of the following: friendly name, manufacturer and model of the projecting device.

Step S602: the server determines types of the plurality of projecting devices according to the metadata of the plurality of projecting devices.

The server determines the type of the projecting device according to at least one item of information as follow: friendly name, manufacturer and model of the projecting device. The type may be a television type, a projector type, a movie screen type, etc.

In an embodiment, the server determines the type of the projecting device according to corresponding relationships of at least one item of information of the projecting device (friendly name, manufacturer and model of the projecting device) and the type of the projecting device. When the metadata of the projecting device includes one item of information, the information has a unique corresponding relationship with the type of the projecting device. Based on this, the server can determine the type of projecting device according to the information and the corresponding relationship. For example, when the projecting device includes: manufacturer 0001 of the projecting device, and the type of the projecting device corresponding to the manufacturer 0001 is the television type, then the server determines that the type of the projecting device is the television type. When the metadata of projecting device includes a plurality items of information, the plurality of items of information have a unique corresponding relationship with the type of projecting device, that is, the plurality of items of information is regarded as one joint information, which has a unique corresponding relationship with the type of projecting device. Then the server can determine the type of the projecting device according to the joint information and the corresponding relationship.

Step S603: the server determines the target projecting device from at least one projecting device according to the types of the plurality of projecting devices and priorities of the device types.

The priorities of device types may be determined in advance. For example, if there are M types in total, then the priorities of the M types are determined in advance and stored in the server.

For example, M=3, and the M types include television, projector and movie screen, where the priority of the television is higher than that of the projector, and the priority of the projector is higher than that of the movie screen.

Further, after the server determines the respective priorities of a plurality of projecting devices, the server selects one projecting device with the highest priority as the target projecting device.

In an embodiment, when there are a plurality of projecting devices with the highest priority, the server may randomly select one projecting device with the highest priority as the target projecting device. Or, the server sends a first projecting device list to each first projecting device, and the first projecting device list is used for the user to input a selection instruction of the target projecting device to the first projecting device. At this time, the user can select, through a first projecting device, one projecting device from the first projecting device list as the target projecting device, that is, the server receives indication information of the target projecting device from the first projecting device and determines the target projecting device according to the indication information of the target projecting device.

To sum up, in the present application, the server can determine the types of the plurality of projecting devices according to the metadata of the plurality of projecting devices. And according to the types of the plurality of projecting devices and the priorities of the device types, the target projecting device is determined from the at least one projecting device. That is, the purpose of automatically selecting the target projecting device is achieved. Further, when there are a plurality of projecting devices with the highest priority, the server can finally determine the target projecting device in combination with the user's operation, thereby improving the flexibility of the projecting device selection.

Figure 7:
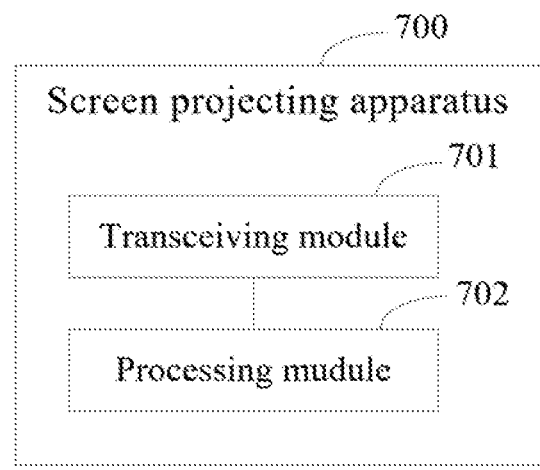
FIG. 7 is a structural schematic diagram of a screen projecting apparatus provided by an embodiment of the present application.

FIG. 7 is a structural schematic diagram of a screen projecting apparatus provided by an embodiment of the present application; as shown in FIG. 7, the apparatus of this embodiment may include: a transceiving module 701, and a processing module 702.

The transceiving module 701, is configured to receive a request for screen projecting from a terminal device, where the request for screen projecting includes indication information of content to be screen-projected; the processing module 702, is configured to acquire the content to be screen-projected according to the request for screen projecting; the transceiving module 701, is further configured to receive a first initiating message of at least one screen projecting source from a target projecting device; the processing module 702, is further configured to determine a target screen projecting source from the at least one screen projecting source; the transceiving module 701, is further configured to send the content to be screen-projected and an identifier of the target screen projecting source to the target projecting device, where the identifier of the target screen projecting source indicates to the target projecting device to display the content to be screen-projected through the target screen projecting source.

In a possible implementation, the first initiating message includes metadata of the at least one screen projecting source; the processing module 702, is specifically configured to: determine a priority of the at least one screen projecting source according to the metadata of the at least one screen projecting source; and determine a screen projecting source with the highest priority among the at least one screen projecting source as the target screen projecting source.

In a possible implementation, the processing module 702, is specifically configured to: for each screen projecting source of the at least one screen projecting source: acquire a confidence score of the each screen projecting source according to metadata of the each screen projecting source; and determine the priority of the at least one screen projecting source according to the respective confidence score of the at least one screen projecting source.

In a possible implementation, the processing module 702, is specifically configured to: acquire the confidence score of the each screen projecting source according to items of information and corresponding relationships included in the metadata of the each screen projecting source; the corresponding relationship includes a plurality of preset information groups and scores corresponding to preset information.

In a possible implementation, the confidence score of the at least one screen projecting source is stored in the screen projecting apparatus, the confidence score of the at least one screen projecting source is used to determine the priority of the at least one screen projecting source, and the processing module 702, is specifically configured to: judge whether there is a first screen projecting source whose metadata is changed in the at least one screen projecting source; if yes, reacquire the confidence score of the first screen projecting source; and determine the priority of the at least one screen projecting source according to the reacquired confidence score of the first screen projecting source and confidence scores of other screen projecting sources of the at least one screen projecting source stored in the screen projecting apparatus.

In a possible implementation, the at least one screen projecting source is a plurality of screen projecting sources, and the plurality of screen projecting sources include a first type of screen projecting source and a second type of screen projecting source; a confidence score of the first type of screen projecting source is stored in the screen projecting apparatus, and the confidence score of the first type of screen projecting source is used to determine a priority of the first type of screen projecting source; the processing module 702, is specifically configured to: acquire a confidence score of the second type of screen projecting source according to metadata of the second type of screen projecting source; and acquire the priority of the at least one screen projecting source according to the confidence score of the first type of screen projecting source and the confidence score of the second type of screen projecting source.

In a possible implementation, before the processing module 702 determines the target screen projecting source from the at least one screen projecting source: the transceiving module 701, is configured to receive second initiating messages from the plurality of projecting devices, where the second initiating messages include metadata of the plurality of projecting devices, and a network where the plurality of projecting devices are located is the same as a network where the terminal device is located; the processing module 702, is configured to determine types of the plurality of projecting devices according to the metadata of the plurality of projecting devices and determine the target projecting device from the plurality of projecting devices according to the types of the plurality of projecting devices and priorities of the device types.

In a possible implementation, the processing module 702, is specifically configured to: determine that a priority of a device type of a plurality of first projecting devices among the plurality of projecting devices is the highest according to the priorities of the device types; the transceiving module 701, is further configured to send a first projecting device list to each of the first projecting devices, where the first projecting device list is used for a user to input a selection instruction of the target projecting device to at least one of the first projecting devices and receive indication information of the target projecting device from the first projecting devices; and the processing module 702, is further specifically configured to: determine the target projecting device according to the indication information of the target projecting device.

The apparatus of this embodiment can be used to implement the technical solutions of the foregoing method embodiments, and its implementation principles and technical effects are similar, which are not repeated herein.

According to the embodiment of the present application, the present application also provides an electronic device and a readable storage medium.

Figure 8:
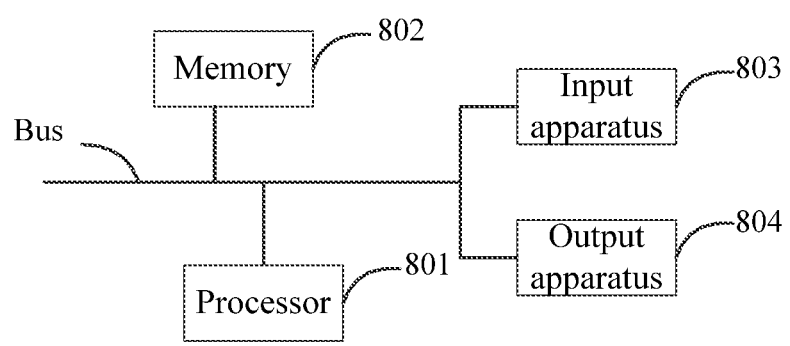
FIG. 8 is a block diagram of an electronic device for implementing the screen projecting method of an embodiment of the present application.

As shown in FIG. 8, it is a block diagram of an electronic device implementing the screen projecting method according to the embodiments of the present application. The electronic device is intended to represent various forms of digital computers, such as laptop computer, desktop computer, workstation, personal digital assistant, server, blade server, mainframe computer, and other suitable computers. The electronic device may also represent various forms of mobile apparatuses, such as personal digital processing, cellular phone, smart phone, wearable device and other similar computing apparatuses. The components shown herein, their connections and relationships, and their functions are merely examples, and are not intended to limit the implementations of the present application described and/or claimed herein.

As shown in FIG. 8, the electronic device includes: one or more processors 801, a memory 802, and interfaces for connecting various components, including high-speed interfaces and low-speed interfaces. The various components are interconnected using different buses, and can be mounted on a common motherboard or otherwise installed as required. The processor may process instructions executed within the electronic device, including instructions stored in or on the memory to display graphical information of Graphical User Interface (GUI) on an external input/output apparatus, such as a display device coupled to an interface. In other implementations, a plurality of processors and/or a plurality of buses may be used together with a plurality of memories, if desired. Similarly, a plurality of electronic devices can be connected, and each device provides part of necessary operations (for example, as a server array, a group of blade servers, or a multiprocessor system). One processor 801 is taken as an example in FIG. 8.

The memory 802 is a non-transitory computer-readable storage medium provided by the present application. The memory stores instructions executable by at least one processor, so that the at least one processor executes the screen projecting method provided by the present application. The non-transitory computer-readable storage medium of the present application stores computer instructions, the computer instructions are used to cause a computer to execute the screen projecting method provided by the present application.

As a non-transitory computer-readable storage medium, the memory 802 may be configured to store non-transitory software programs, non-transitory computer-executable programs and modules, such as program instructions/modules corresponding to the screen projecting method in the embodiments of the present application (for example, the transceiving module 701 and the processing module 702 shown in FIG. 7). The processor 801 executes various functional applications and data processing of the server by running non-transitory software programs, instructions and modules stored in the memory 802, that is, the screen projecting method in the above-mentioned method embodiments are realized.

The memory 802 may include a storage program area and a storage data area, where the storage program area may store an operating system and at least one application program required for functions; the storage data area may store data created according to the use of the electronic device of the screen projecting method, and the like. In addition, the memory 802 may include high-speed random access memory, and may also include non-transitory memory, such as at least one magnetic disk memory device, flash memory device, or other non-transitory solid-state memory devices. In some embodiments, the memory 802 may include memories remotely disposed with respect to the processor 801, and these remote memories may be connected to the electronic device implementing the screen projecting method through a network. Examples of the above-mentioned network include, but are not limited to, an Internet, an intranet, a local area network, a mobile communication network and combination thereof.

The electronic device for implementing the screen projecting method may further include an input apparatus 803 and an output apparatus 804. The processor 801, the memory 802, the input apparatus 803, and the output apparatus 804 can be connected through a bus or other means. In FIG. 8, a connection through a bus is taken as an example.

The input apparatus 803 may receive input numeric or character information, and generate key signal inputs related to user settings and function control of electronic device for implementing screen projecting method, for example input apparatus such as touch screen, keypad, mouse, track pad, touch pad, pointing stick, one or more mouse buttons, trackball, joystick. The output apparatus 804 may include a display device, an auxiliary lighting apparatus (e.g., an LED), a haptic feedback apparatus (e.g., a vibration motor), and the like. The display device may include, but is not limited to, a liquid crystal display (LCD), a light-emitting diode (LED) display, and a plasma display. In some implementations, the display device may be a touch screen.

Various implementations of the systems and technologies described herein may be implemented in a digital electronic circuit system, an integrated circuit system, an application-specific ASIC (application-specific integrated circuit), computer hardware, firmware, software, and/or combination thereof. These various implementations may include implemented in one or more computer programs, the one or more computer programs are executable and/or interpreted on a programmable system including at least one programmable processor, the programmable processor may be a dedicated or general-purpose programmable processor that may receive data and instructions from a storage system, at least one input device, and at least one output device, and transmit data and instructions to the storage system, at least one input apparatus, and at least one output apparatus.

These computing programs (also known as programs, software, software applications, or codes) include machine instructions of a programmable processor, and can be implemented by using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (e.g., a magnetic disk, an optical disk, a memory, a programmable logic device (PLD)), including machine-readable medium that receive machine instructions as machine-readable signals. The term "machine-readable signal" refers to any signal used to provide machine instructions and/or data to a programmable processor.

To provide interaction with the user, the systems and technologies described herein can be implemented on a computer having: a display apparatus (e.g., a CRT (cathode ray tube) or LCD (liquid crystal display) monitor) for displaying information to the user; and a keyboard and pointing device (e.g., a mouse or a trackball) through which the user can provide input to the computer. Other kinds of apparatuses may also be used to provide interaction with a user; for example, the feedback provided to the user may be any form of sensor feedback (for example, visual feedback, audible feedback, or haptic feedback); and may receive input from the user in any form, including acoustic input, voice input or haptic input.

The systems and technologies described herein can be implemented in a computing system including background components (e.g., as a data server), or a computing system including middleware components (e.g., an application server), or a computing system including front-end components (e.g., a user computer with a graphical user interface or a web browser through which users can interact with implementation of the systems and technologies described herein), or a computing system that includes any combination of such back-end components, middleware components, or front-end components. The components of the systems can be interconnected by any form or medium of digital data communication of digital data communication (e.g., a communication network). Examples of communication networks include local area network (LAN), wide area network (WAN), and Internet.

The computer system may include a client side and a server. The client side and the server are generally remote from each other and typically interact through a communication network. The relationship between the client side and server is generated by computer programs running on a corresponding computer and having a client side-server relationship with each other.

The present application provides a screen projecting method, includes: receiving by the server a request for screen projecting from a terminal device, wherein the request for screen projecting comprises indication information of the content to be screen-projected; acquiring the content to be screen-projected according to the request for screen projecting; receiving a first initiating message from at least one screen projecting source of a target projecting device, and determining a target screen projecting source from the at least one screen projecting source; sending the content to be screen-projected and the identifier of the target screen projecting source to the target projecting device, so that the target projecting device displays the content to be screen-projected through the target screen projecting source. That is, in the present application, the server can automatically determine the target screen projecting source without searching for available screen projecting sources, and send them to the projecting device for the user to select the screen projecting source, thus improving the screen projecting efficiency.

It should be understood that various forms of processes shown above can be used to reorder, add, or delete steps. For example, various steps recorded in the present application can be executed in parallel, sequentially or in different orders. As long as the desired results of the technical solutions disclosed in the present application can be achieved, there is no limitation herein.

The above-mentioned specific implementations do not constitute a limitation of the protection scope of the present application. It should be understood by those skilled in the art that various modifications, combinations, sub-combinations and substitutions may be made according to design requirements and other factors. Any modification, equivalent replacement, improvement and the like made within the spirit and principle of the present application shall be included in the protection scope of the present application.

What is claimed is:

1. A screen projecting method applied to a server, comprising:
   receiving a request for screen projecting from a terminal device, wherein the request for screen projecting comprises indication information of content to be screen-projected;
   acquiring the content to be screen-projected according to the request for screen projecting;
   receiving a first initiating message of at least one screen projecting source from a target projecting device, and determining a target screen projecting source from the at least one screen projecting source; and
   sending the content to be screen-projected and an identifier of the target screen projecting source to the target projecting device, wherein the identifier of the target screen projecting source indicates to the target projecting device to display the content to be screen-projected through the target screen projecting source.

2. The screen projecting method according to claim 1, wherein the first initiating message comprises metadata of the at least one screen projecting source; the determining the target screen projecting source from the at least one screen projecting source comprises:
   determining a priority of the at least one screen projecting source according to the metadata of the at least one screen projecting source; and
   determining a screen projecting source with the highest priority among the at least one screen projecting source as the target screen projecting source.

3. The screen projecting method according to claim 2, wherein the determining the priority of the at least one screen projecting source according to the metadata of the at least one screen projecting source comprises:
   for each screen projecting source of the at least one screen projecting source: acquiring a confidence score of the each screen projecting source according to metadata of the each screen projecting source; and
   determining the priority of the at least one screen projecting source according to the respective confidence score of the at least one screen projecting source.

4. The screen projecting method according to claim 3, wherein the acquiring the confidence score of the each screen projecting source according to the metadata of the each screen projecting source comprises:
   acquiring the confidence score of the each screen projecting source according to items of information and corresponding relationships comprised in the metadata of the each screen projecting source; wherein the corresponding relationship comprises a plurality of preset information groups and scores corresponding to preset information.

5. The screen projecting method according to claim 2, wherein the confidence score of the at least one screen projecting source is stored in the server, and the confidence score of the at least one screen projecting source is used to determine the priority of the at least one screen projecting source; the determining the priority of the at least one screen projecting source according to the metadata of the at least one screen projecting source comprises:
   judging whether there is a first screen projecting source whose metadata is changed in the at least one screen projecting source;
   if yes, reacquiring a confidence score of the first screen projecting source; and
   determining the priority of the at least one screen projecting source according to the reacquired confidence score of the first screen projecting source and confidence scores of other screen projecting sources of the at least one screen projecting source stored in the server.

6. The screen projecting method according to claim 2, wherein the at least one screen projecting source is a plurality of screen projecting sources, and the plurality of screen projecting sources comprise a first type of screen projecting source and a second type of screen projecting source; a confidence score of the first type of screen projecting source is stored in the server, and the confidence score of the first type of screen projecting source is used to determine a priority of the first type of screen projecting source; the determining the priority of the at least one screen projecting source according to the metadata of the at least one screen projecting source comprises:

acquiring a confidence score of the second type of screen projecting source according to metadata of the second type of screen projecting source; and acquiring the priority of the at least one screen projecting source according to the confidence score of the first type of screen projecting source and the confidence score of the second type of screen projecting source.

7. The screen projecting method according to claim 1, before determining the target screen projecting source from the at least one screen projecting source, further comprising:

receiving second initiating messages from a plurality of projecting devices, wherein the second initiating messages comprise metadata of the plurality of projecting devices, and a network where the plurality of projecting devices are located is the same as a network where the terminal device is located;

determining types of the plurality of projecting devices according to the metadata of the plurality of projecting devices; and determining the target projecting device from the plurality of projecting devices according to the types of the plurality of projecting devices and priorities of device types.

8. The screen projecting method according to claim 7, wherein the determining the target projecting device from the plurality of projecting devices according to the types of the plurality of projecting devices and the priorities of the device types comprises:

determining that a priority of a device type of a plurality of first projecting devices among the plurality of projecting devices is the highest according to the priorities of the device types;

sending a first projecting device list to each of the first projecting devices, wherein the first projecting device list is used for a user to input a selection instruction of the target projecting device to at least one of the first projecting devices;

receiving indication information of the target projecting device from the first projecting devices; and determining the target projecting device according to the indication information of the target projecting device.

9. A screen projecting apparatus, comprising:
at least one processor; and
a memory communicatively connected to the at least one processor; wherein,
the memory stores instructions executable by the at least one processor, the instructions being executed by the at least one processor to enable the at least one processor to execute the following steps:

receiving a request for screen projecting from a terminal device, wherein the request for screen projecting comprises indication information of content to be screen-projected;

acquiring the content to be screen-projected according to the request for screen projecting;

receiving a first initiating message of at least one screen projecting source from a target projecting device;

determining a target screen projecting source from the at least one screen projecting source; and sending the content to be screen-projected and an identifier of the target screen projecting source to the target projecting device, wherein the identifier of the target screen projecting source indicates to the target projecting device to display the content to be screen-projected through the target screen projecting source.

10. The screen projecting apparatus according to claim 9, wherein the first initiating message comprises metadata of the at least one screen projecting source; the at least one processor is further enabled to execute the following steps:

determining a priority of the at least one screen projecting source according to the metadata of the at least one screen projecting source; and determining a screen projecting source with the highest priority among the at least one screen projecting source as the target screen projecting source.

11. The screen projecting apparatus according to claim 10, wherein the at least one processor is further enabled to execute the following steps:

for each screen projecting source of the at least one screen projecting source: acquiring a confidence score of the each screen projecting source according to metadata of the each screen projecting source; and determining the priority of the at least one screen projecting source according to the respective confidence score of the at least one screen projecting source.

12. The screen projecting apparatus according to claim 11, wherein the at least one processor is further enabled to execute the following step:

acquiring the confidence score of the each screen projecting source according to items of information and corresponding relationships comprised in the metadata of the each screen projecting source; wherein the corresponding relationship comprises a plurality of preset information groups and scores corresponding to preset information.

13. The screen projecting apparatus according to claim 10, wherein the confidence score of the at least one screen projecting source is stored in the server, and the confidence score of the each screen projecting source is used to determine the priority of the each screen projecting source; the at least one processor is further enabled to execute the following steps:

judging whether there is a first screen projecting source whose metadata is changed in the at least one screen projecting source;

if yes, reacquiring a confidence score of the first screen projecting source; and determining the priority of the at least one screen projecting source according to the reacquired confidence score of the first screen projecting source and the confidence scores of other screen projecting sources of the at least one screen projecting source stored in the server.

14. The screen projecting apparatus according to claim 10, wherein the at least one screen projecting source is a plurality of screen projecting sources, and the plurality of screen projecting sources comprise a first type of screen projecting source and a second type of screen projecting source; a confidence score of the first type of screen projecting source is stored in the server, and the confidence score of the first type of screen projecting source is used to determine a priority of the first type of screen projecting source;

the at least one processor is further enabled to execute the following steps:

acquiring a confidence score of the second type of screen projecting source according to metadata of the second type of screen projecting source; and acquiring the priority of the at least one screen projecting source according to the confidence score of the first type of screen projecting source and the confidence score of the second type of screen projecting source.

15. The screen projecting apparatus according to claim 9, before determining the target screen projecting source from the at least one screen projecting source, the at least one processor is further enabled to execute the following steps:
receiving second initiating messages from a plurality of projecting devices, wherein the second initiating messages comprise metadata of the plurality of projecting devices, and a network where the plurality of projecting devices are located is the same as a network where the terminal device is located; and
determining types of the plurality of projecting devices according to the metadata of the plurality of projecting devices; and determining the target projecting device from the plurality of projecting devices according to the types of the plurality of projecting devices and priorities of the device types.

16. The screen projecting apparatus according to claim 15, wherein the at least one processor is further enabled to execute the following steps:
determining that a priority of a device type of a plurality of first projecting devices among the plurality of projecting devices is the highest according to the priorities of the device types;
sending a first projecting device list to each of the first projecting devices, wherein the first projecting device list is used for a user to input a selection instruction of the target projecting device to at least one of the first projecting devices; and
receiving indication information of the target projecting device from the first projecting devices; and
determining the target projecting device according to the indication information of the target projecting device.

17. A non-transitory computer-readable storage medium storing computer instructions, wherein the computer instructions are used to cause a computer to execute the following steps:
receiving a request for screen projecting from a terminal device, wherein the request for screen projecting comprises indication information of content to be screen-projected;
acquiring the content to be screen-projected according to the request for screen projecting;
receiving a first initiating message of at least one screen projecting source from a target projecting device, and determining a target screen projecting source from the at least one screen projecting source; and
sending the content to be screen-projected and an identifier of the target screen projecting source to the target projecting device, wherein the identifier of the target screen projecting source indicates to the target projecting device to display the content to be screen-projected through the target screen projecting source.

18. The non-transitory computer-readable storage medium according to claim 17, wherein the first initiating message comprises metadata of the at least one screen projecting source; the computer instructions are further used to cause the computer to execute the following steps:
determining a priority of the at least one screen projecting source according to the metadata of the at least one screen projecting source; and
determining a screen projecting source with the highest priority among the at least one screen projecting source as the target screen projecting source.

19. The non-transitory computer-readable storage medium storing computer instructions according to claim 18, wherein the computer instructions are further used to cause the computer to execute the following steps:
for each screen projecting source of the at least one screen projecting source: acquiring a confidence score of the each screen projecting source according to metadata of the each screen projecting source; and
determining the priority of the at least one screen projecting source according to the respective confidence score of the at least one screen projecting source.

20. The non-transitory computer-readable storage medium storing computer instructions according to claim 19, wherein the computer instructions are further used to cause the computer to execute the following step:
acquiring the confidence score of the each screen projecting source according to items of information and corresponding relationships comprised in the metadata of the each screen projecting source; wherein the corresponding relationship comprises a plurality of preset information groups and scores corresponding to preset information.

* * * * *